Aug. 8, 1967
J. A. LAUCK
3,334,488
CONTROL SYSTEM FOR HYDRAULIC TRACTOR
ATTACHMENTS AND THE LIKE
Filed Oct. 21, 1965
3 Sheets-Sheet 1
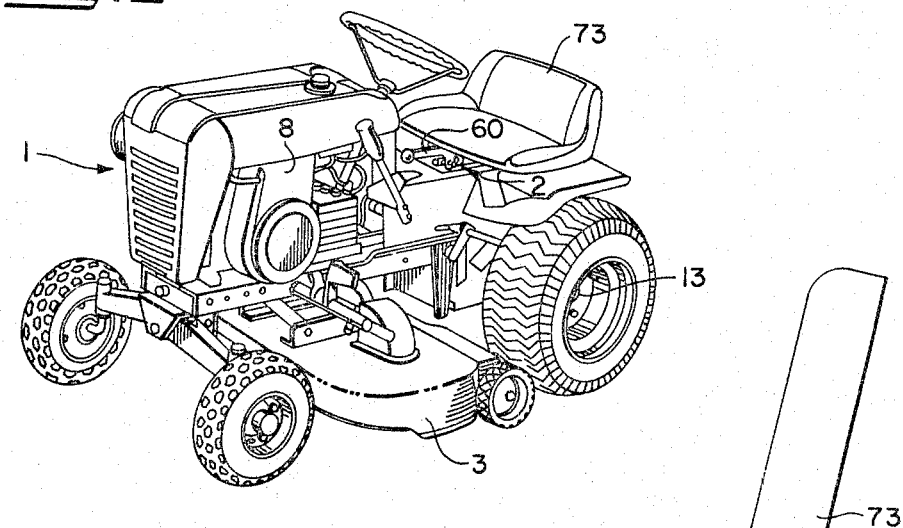
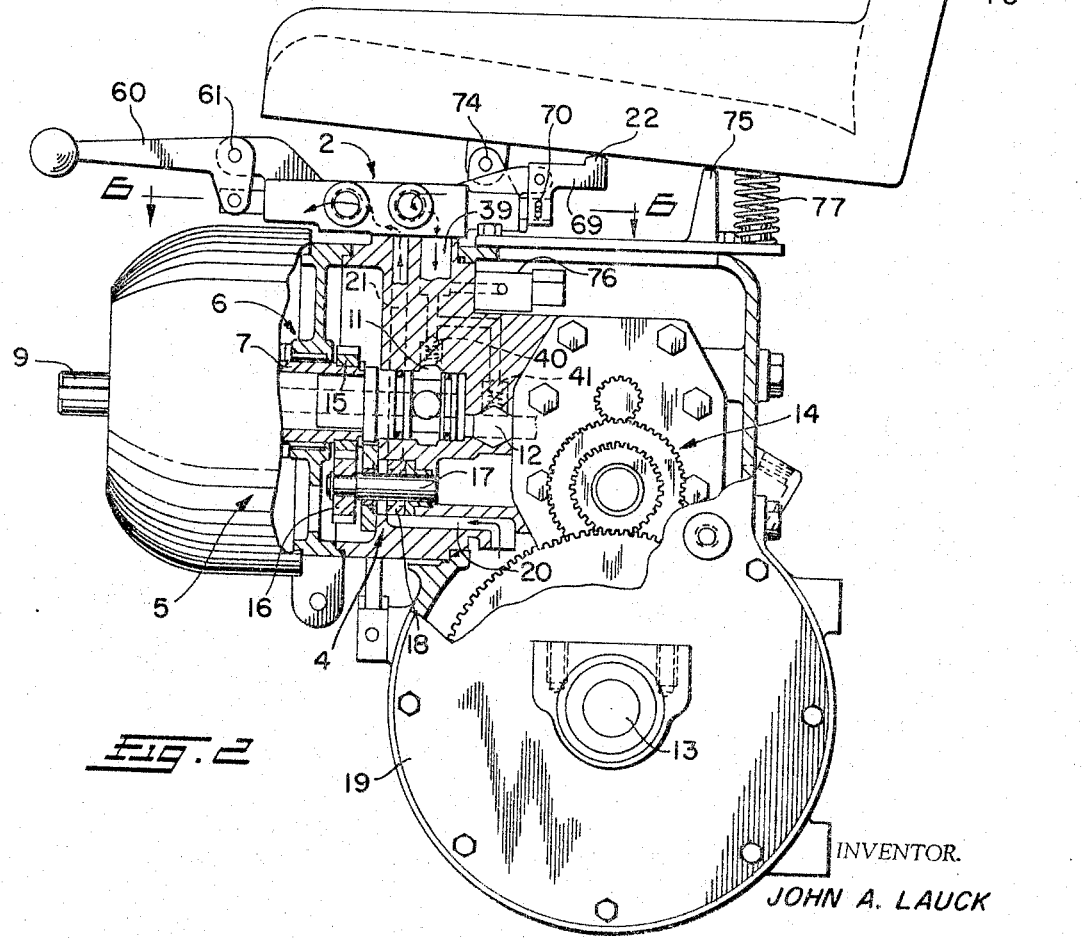
INVENTOR.
JOHN A. LAUCK
BY
Oberlin, Maky & Donnelly
ATTORNEYS

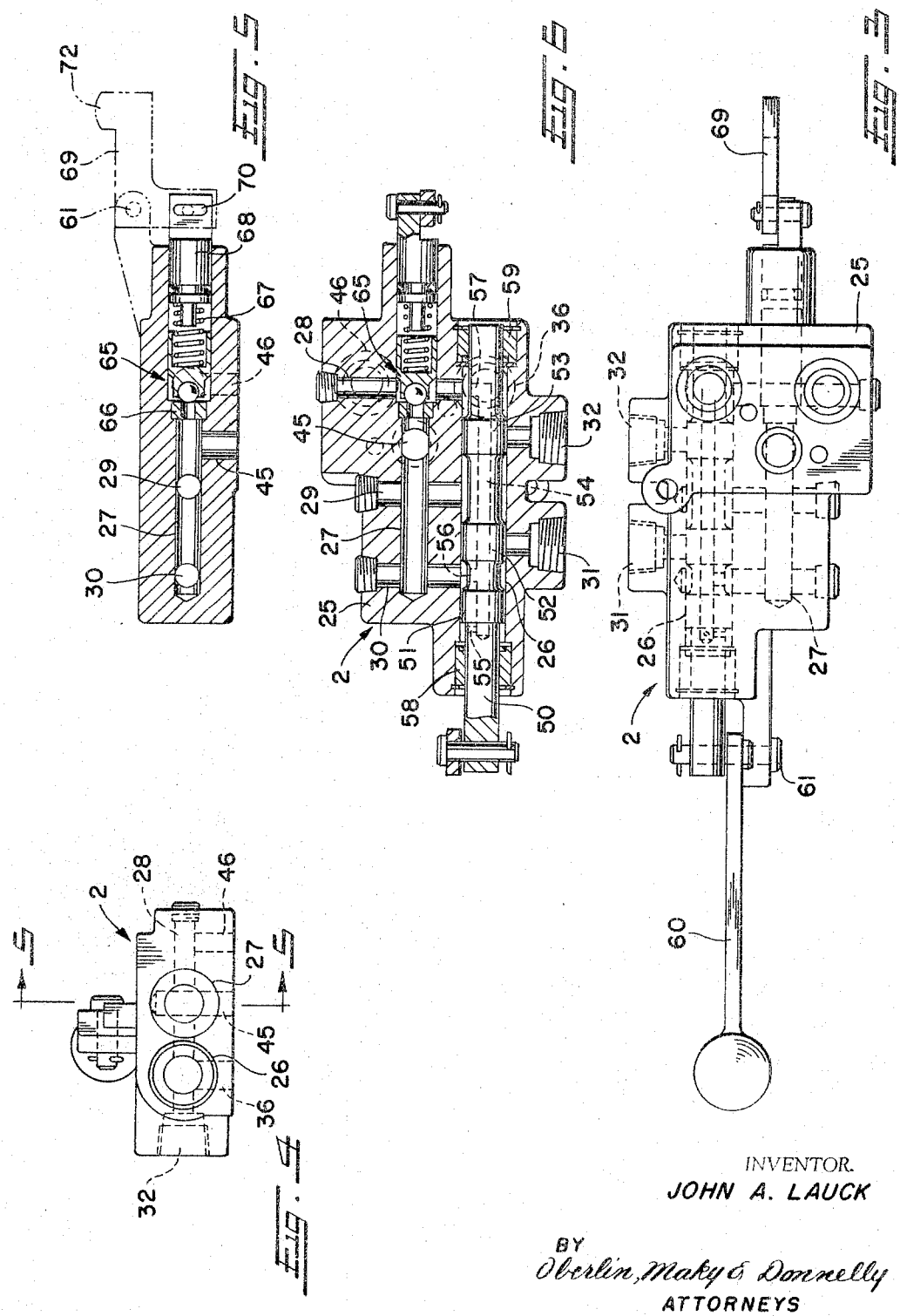

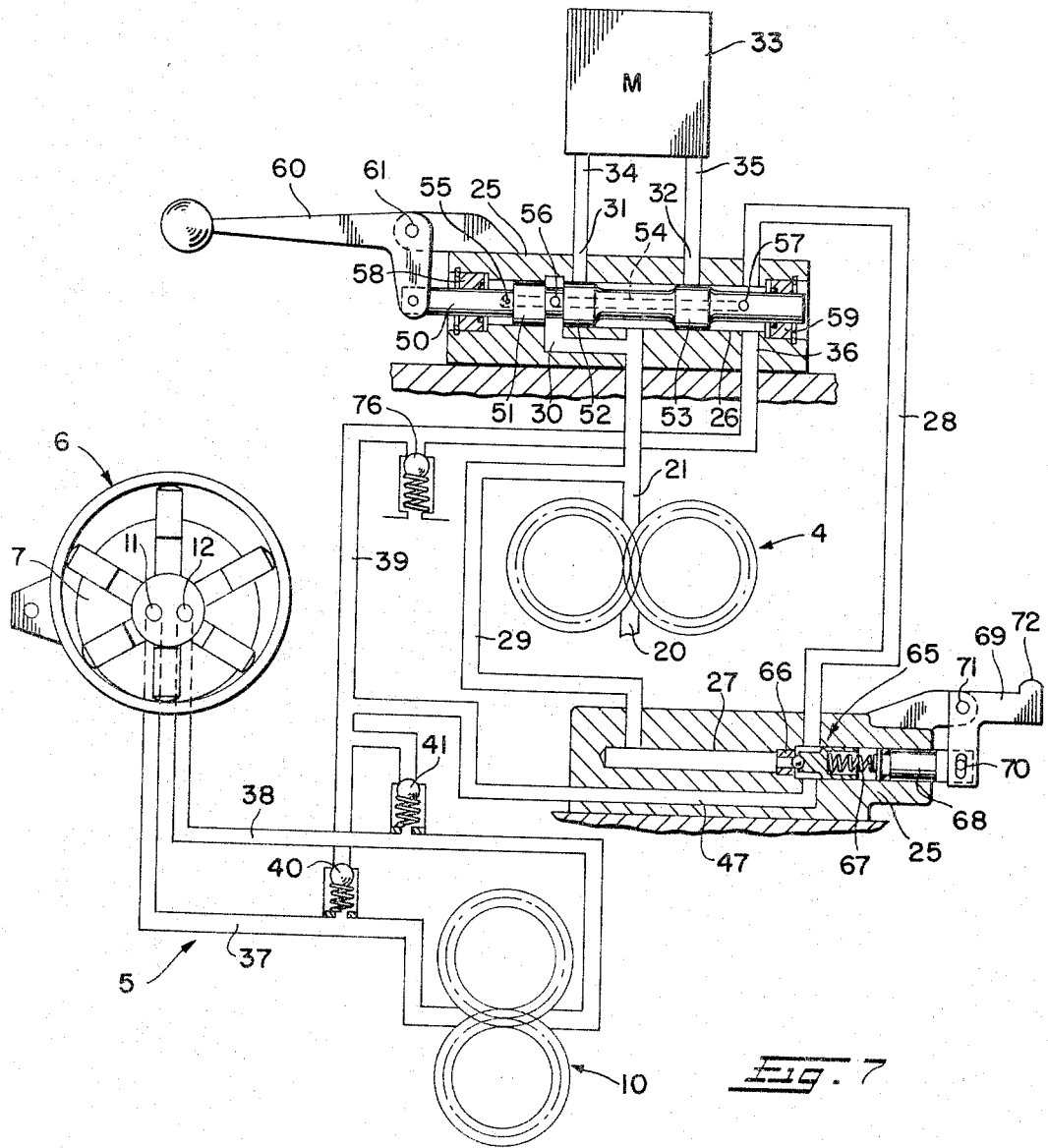

United States Patent Office 3,334,488
Patented Aug. 8, 1967

3,334,488
CONTROL SYSTEM FOR HYDRAULIC TRACTOR
ATTACHMENTS AND THE LIKE
John A. Lauck, 1767 Commonwealth Ave.,
Benton Harbor, Mich. 49022
Filed Oct. 21, 1965, Ser. No. 499,689
10 Claims. (Cl. 60—52)

ABSTRACT OF THE DISCLOSURE

A control system having a control valve for selectively supplying hydraulic fluid from a make-up pump to hydraulically actuated tractor attachments without interrupting the flow from the make-up pump to a hydrostatic transmission for the tractor. A relief valve precludes a build up of fluid actuating pressure when the seat of the tractor is unoccupied.

The present invention relates generally, as indicated, to a control system for hydraulic tractor attachments and the like, and, more particularly, to a control system including a safety relief valve mechanism which permits actuation of the attachments only when the operator is properly seated on the tractor.

In the past, tractor operators have been the victims of a great many needless accidents resulting in the loss of fingers, toes, and limbs due to their leaving the tractor to inspect or attempt to unclog a tractor attachment without first making sure that the operating lever for controlling the flow of hydraulic actuating fluid to the attachment is in the "off" position. Such accidents are becoming an everyday occurrence, especially now that so many homeowners are using small garden or lawn tractors equipped with mowers for mowing the grass and snow blowers for removing snow from sidewalks and driveways. Accordingly, it has become increasingly important that this type of accident be eliminated altogether, which is the principal object of the present invention.

Another object is to provide a novel control system for controlling the actuation of such hydraulic attachments as rotary mowers, sickle bar mowers, snow blowers, and powered tillers, such control mechanism including a control valve for supplying hydraulic fluid to the attachments, and a relief valve for releasing the high pressure actuating fluid under certain conditions, thereby making it impossible to actuate the attachments even though the control valve is in an operating position.

Still another object is to provide a control system of the type described in which the relief valve is operatively connected to the tractor seat in such a way that when the operator leaves the seat, the spring load on the relief valve is released, thereby precluding a build up of actuating pressure in the system.

A further object is to connect such a control system to the make-up and piston return pump circuit of the hydrostatic transmission for the tractor to obtain the fluid necessary for operating the attachments, thereby eliminating the need of a separate hydraulic pump, valve, and reservoir package for the attachments.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the several ways in which the principle of the invention may be employed.

In said annexed drawing:

FIG. 1 is a perspective view of a conventional garden tractor or the like on which there is mounted a preferred form of control system in accordance with the present invention for supplying actuating fluid to an attachment;

FIG. 2 is a side elevation view, partially broken away, showing the manner in which the control system is connected to the hydrostatic transmission for the tractor;

FIG. 3 is a bottom plan view of the control system as seen in FIG. 2;

FIG. 4 is an end elevation view of such control system as seen from the right side of FIG. 2;

FIG. 5 is a vertical section taken on the plane of the line 5—5 of FIG. 4 showing the details of the relief valve for the control system;

FIG. 6 is a horizontal section of the control system taken on the plane of the line 6—6 of FIG. 2; and FIG. 7 is a schematic diagram of the control system showing the exact manner in which it is connected to the hydrostatic transmission of a tractor.

Turning now to the details of the drawing, and first of all to FIG. 1, there is illustrated by way of example a small garden type tractor 1 on which there is mounted a preferred form of control system 2 in accordance with the present invention for actuating a tractor attachment 3 such as a rotary mower. Although not absolutely necessary, it is desirable that the control system 2 receive actuating fluid from the make-up and piston return pump 4 of the hydrostatic transmission 5, or otherwise a separate pump and hydraulic fluid source would be required.

As can be seen in FIGS. 2 and 7, the hydrostatic transmission 5 is of a well known type, it comprising a rotary pump 6 including a rotor 7 which is driven by the tractor engine 8 through the input shaft 9; and a gear type hydraulic motor 10 which is driven by high pressure fluid emitted from one or the other of the ports 11 and 12 of the rotary pump 6. The hydraulic motor 10 is in turn operatively connected to the rear axle 13 of the tractor 1 through suitable gearing 14 to effect rotation thereof. For a more complete discussion of the construction and operation of the hydrostatic transmission 5, reference may be had to Patent No. 3,171,255, granted to John A. Lauck on Mar. 2, 1965.

Referring further to FIG. 2, a driving gear 15 is mounted on the pump rotor 7 for rotation therewith and is in meshing engagement with a driven gear 16 carried by one of the gear shafts 17 of the make-up pump 4. Thus, rotation of the input shaft 9 causes rotation of the make-up pump gears 18 to draw fluid from the reservoir 19 for use in actuating the tractor attachment 2, such fluid passing from the reservoir 19 through the flow lines 20 and 21 to the control system 2.

As clearly shown in FIGS. 3–6, the housing 25 of the control system 2 has a pair of laterally spaced, parallel bores 26 and 27 therein interconnected by three axially spaced passages 28, 29, and 30. The bore 26 is also intersected by a pair of motor ports 31 and 32 which are adapted to be connected to the hydraulic motor 33 of the attachment 3 through suitable supply lines 34 and 35 (see FIG. 7), and a return port 36 which is located adjacent the intersection of the passage 28 with the bore 26 and is adapted to be connected to one or the other of the main fluid passages 37 and 38 of the hydrostatic transmission 5 via a passageway 39 and check valves 40, 41. The bore 27, on the other hand, is intersected by an inlet port 45 between the transverse passages 28 and 29, such inlet port being adapted to be connected to the fluid supply line 21 leading from the make-up pump 4. Finally, the transverse passage 28 is intersected by a second return port 46 which, like the first-mentioned return port 36, leads to the main fluid passages 37 and 38 of the hydrostatic transmission 5 via passageways 47, 39.

Within the bore 26 there is slidably received a control valve 50, it having three axially spaced lands 51, 52, and 53, a central opening 54 extending beyond the outer lands 51 and 53, and three lateral ports 55, 56, and 57 extending through the wall of the control valve 50 and communicating with the central opening 54. The port 55 is located beyond the outermost land 51 to permit the escape of fluid which might otherwise become trapped between the land 51 and the adjacent bore seal 58; the port 56 is between the lands 51 and 52; and the port 57 is located between the innermost land 53 and the other bore seal 59. The spacing between the lands 51, 52, and 53 is such that when the control valve 50 is in the neutral position shown in FIG. 6 with the control handle 60 substantially horizontal as seen in FIGS. 1 and 2, fluid communication between the inlet port 45 and motor ports 31 and 32 is blocked by the lands 52 and 53, and fluid communication is established between the inlet port 45 and the return ports 36 and 46 via the bore 27, passage 30, ports 56, 57 and central opening 54 in the control valve 50, and passage 28. Accordingly, with the control valve 50 in the neutral position, the hydraulic motor 33 of the attachment 3 cannot be actuated, and yet the flow from the make-up pump 4 to the main pump 6 for making up fluid losses in the hydraulic system for the hydrostatic transmission 5 is not interrupted.

For actuating the attachment 3, the control handle 60 is moved up or down to one of two operating positions, depending upon the direction in which it is desired to drive the attachment motor 33. Thus, to provide high pressure fluid at the motor port 31 for driving the motor 33 in one direction, the control handle 60 is swung upwardly about its pivot connection 61 on the tractor frame 62 to cause the spool valve 50 to move to the left as viewed in FIGS. 6 and 7 to a position whereat the middle land 52 blocks the passage 30 and the inner land 53 is located between the passage 29 and motor port 32. With the control valve 50 so disposed, high pressure fluid is permitted to pass from the inlet port 45 to the motor port 31 and hydraulic motor 33 through the bore 27 and passage 29, while the return fluid from the motor port 32 is directed through the control system 2 to one or the other of the return ports 36 and 46 for return to the fluid system for the hydrostatic transmission 5.

Conversely, when it is desired to supply high pressure fluid to the motor port 32, the control handle 60 is lowered to cause the control valve 50 to move to the right to a position whereat the lands 51 and 53 block the passages 30 and 28, respectively, the land 52 blocks fluid communication between the passage 29 and motor port 31, and the valve port 56 is in line with the motor port 31. Under these conditions, the high pressure fluid from the make-up pump 4 entering the inlet port 45 passes through the bore 27, passage 29, and motor port 32 to the hydraulic motor 33, and the return fluid passes through the control system 3 to the hydraulic system for the hydrostatic transmission 5 through the motor port 31, ports 56 and 57 and central opening 54 in the control valve 50, and one or the other of the return ports 36, 46. Accordingly, as is now quite evident, fluid from the make-up pump 4 is always available to make up any fluid losses which occur in the main fluid system of the hydrostatic transmission 5, either directly from the make-up pump through the by-pass of the control valve 50 as when the control valve is in neutral position, or from the return of the hydraulic attachment motor 33.

Within the bore 27 there is a relief valve 65 which is normally urged into engagement with a valve seat 66 by a compression spring 67 to block fluid communication between the inlet port 45 and the return ports 36 and 46 via bore 27 and passage 28. The relief valve spring 67 rests against a plunger 68 in the bore 27 which is operatively connected to a seat lever 69 through a pin-slot connection 70, such seat lever 69 being pivotally mounted to the valve housing 25 at 71. As clearly shown in FIG. 2, the seat lever 69 has a projection 72 thereon which is maintained in engagement with the operator's seat 73 on the tractor 1 by the action of the relief valve spring 67. When the operator is properly positioned on the seat 73, the weight of the operator causes the seat to swing about its pivot connection 74 against a stop 75, thereby urging the seat lever 69 downwardly and thus the plunger 68 axially into the bore 27 to compress the valve spring 67 to the full relief pressure setting.

Under these conditions, the hydraulic attachment 3 can be operated simply by moving the control handle 60 to the desired operating position. However, should the fluid pressure in the system for the hydraulic attachment 3 rise above a predetermined level, as when the rotating member of the attachment is clogged, for example, such pressure rise will be controlled by the relief valve 65 to permit the fluid to by-pass the control system 2 and travel through the return ports 36, 46 to the inlet of the main pump 6, or if no make-up fluid is needed, back to the reservoir 19 through the relief valve 76 in the passageway 39. Moreover, should the operator leave the tractor seat 73 for any reason, the seat will be urged upwardly by a spring 77 to a position whereat the spring load on the relief valve 65 is released and the high pressure is unloaded through the relief valve, whereby there is insufficient pressure to actuate the hydraulic attachment 3. Accordingly, even if the control handle 60 is in an operative position, there is no danger that the operator will be injured by the attachment even should he attempt to unclog it, since the attachment is now inoperative, and will remain so until the operator once again is properly positioned on the seat 73 and the spring 67 is compressed to the full relief pressure setting.

From the above discussion, it is now readily apparent that the control system of the present invention is quite simple in construction, relatively inexpensive to manufacture, and prevents actuation of an attachment for a tractor or the like when the tractor seat is unoccupied, thereby eliminating any danger of an operator being injured while attempting to unclog the same, even though the control handle may be in an operative position.

Other modes of applying the principles of the invention may be employed, change being made as regards the details described, provided the features stated in any of the following claims or the equivalent of such be employed.

I therefore, particularly point out and distinctly claim as my invention:

1. In combination, a hydrostatic transmission, a make-up pump, a hydraulic motor, and a control system for directing high pressure fluid from said make-up pump to said hydraulic motor and said hydrostatic transmission, said control system being disposed between said hydrostatic transmission and said make-up pump whereby the fluid from said make-up pump must first pass through said control system before entering said hydrostatic transmission, said control system comprising a valve means operative in one position to permit such fluid from said make-up pump to by-pass said hydraulic motor and flow directly to said hydrostatic transmission, and operative in another position to direct such fluid to said hydraulic motor to actuate the same and direct the return fluid from said hydraulic motor to said hydrostatic transmission, said control system further comprising a relief valve and valve spring for permitting such fluid to by-pass said hydraulic motor when the pressure of such fluid reaches a predetermined value, and means for automatically varying the relief pressure setting of said valve spring in response to the amount of external pressure being applied thereto to vary such predetermined value.

2. The combination of claim 1 wherein said last-mentioned means comprises a movable plunger which is engaged by one end of said spring, and a lever means operatively connected to said plunger for effecting movement of said plunger toward and away from said spring means to change its relief pressure setting.

3. The combination of claim 1 wherein said valve means comprises a valve housing, a bore in said valve housing intersected axially therealong by a pair of inlet passages in fluid communication with said make-up pump, a pair of motor ports in fluid communication with said hydraulic motor, and a return port in fluid communication with said hydrostatic transmission, and a spool valve slidably received in said bore for movement to such one position blocking fluid communication between said make-up pump and said hydraulic motor and establishing fluid communication between said make-up pump and said hydrostatic transmission, said spool valve also being adapted to be moved to such another position to establish fluid communication between said make-up pump and said hydraulic motor, and to establish fluid communication between the return of said hydraulic motor and said hydrostatic transmission, whereby there is no interruption of flow to said hydrostatic transmission from said make-up pump regardless of whether or not said hydraulic motor is being actuated.

4. The combination of claim 3 wherein said spool valve has a plurality of axially spaced lands for blocking fluid communication between the various ports and passages as aforesaid when in one or the other of such positions, and a central passageway in said spool valve intersected by ports for establishing fluid communication directly between said make-up pump and hydrostatic transmission when said spool valve is in such one position.

5. The combination of claim 2 wherein said relief valve is in a second bore in said housing, said second bore being in fluid communication with said make-up pump and said hydrostatic transmission, and said relief valve blocking fluid communication between said make-up pump and said hydrostatic transmission through said second bore except when the pressure of such fluid is sufficient to overcome the bias of said relief valve spring.

6. The combination of claim 1 wherein said hydrostatic transmission further comprises a rotor-pintle type pump, said pintle being stationary and said rotor being adapted to be driven by a prime mover, control means operatively connected to said rotor-pintle type pump for obtaining a predetermined flow output therefrom, and a driving gear mounted on said rotor for rotation therewith, said make-up pump comprising a pair of intermeshing pump gears mounted on gear shafts, one of said gear shafts having a driven gear mounted thereon and in meshing engagement with said driving gear on said rotor, whereby rotation of said rotor also causes rotation of said make-up pump gears.

7. The combination of claim 2 further comprising a seat pivotally mounted with respect to said relief valve for movement toward and away from said lever means to cause such movements of said plunger, whereby when said seat is occupied, said spring is compressed to its full relief pressure setting, and when said seat is unoccupied, the relief pressure setting of said spring is substantially reduced to preclude a build up of sufficient high pressure fluid to actuate said hydraulic motor.

8. In combination, a hydrostatic transmission, a make-up pump, a hydraulic motor, and a control system for directing high pressure fluid from said make-up pump to said hydraulic motor and said hydrostatic transmission, said control system being disposed between said hydrostatic transmission and said make-up pump whereby the fluid from said make-up pump must first pass through said control system before entering said hydrostatic transmission, said control system comprising a valve means operative in one position to permit such fluid from said make-up pump to by-pass said hydraulic motor and flow directly to said hydrostatic transmission, and operative in another position to direct such fluid through said hydraulic motor to actuate the same and direct the return fluid from said hydraulic motor to said hydrostatic transmission.

9. The combination of claim 8 wherein said valve means comprises a valve housing, a bore in said valve housing intersected axially therealong by a pair of inlet passages in fluid communication with said make-up pump, a pair of motor ports in fluid communication with said hydraulic motor, and a return port in fluid communication with said hydrostatic transmission, and a spool valve slidably received in said bore for movement to such one position blocking fluid communication between said make-up pump and said hydraulic motor and establishing fluid communication between said make-up pump and said hydrostatic transmission, said spool valve also being adapted to be moved to such another position to establish fluid communication between said make-up pump and said hydraulic motor, and to establish fluid communication between the return of said hydraulic motor and said hydrostatic transmission, whereby there is no interruption of flow to said hydrostatic transmission from said make-up pump regardless of whether or not said hydraulic motor is being actuated.

10. The combination of claim 8 wherein said hydrostatic transmission further comprises a rotor-pintle type pump, said pintle being stationary and said rotor being adapted to be driven by a prime mover, control means operatively connected to said rotor-pintle type pump for obtaining a predetermined flow output therefrom, and a driving gear mounted on said rotor for rotation therewith, said make-up pump comprising a pair of intermeshing pump gears mounted on gear shafts, one of said gear shafts having a driven gear mounted thereon and in meshing engagement with said driving gear on said rotor, whereby rotation of said rotor also causes rotation of said make-up pump gears.

References Cited

UNITED STATES PATENTS 1,650,338 11/1927 Fornaca.
1,838,668 12/1931 Frock.
2,931,454 4/1960 Schuster _____ 180—82

EDGAR W. GEOGHEGAN, *Primary Examiner.*